United States Patent
Seger et al.

(10) Patent No.: US 8,317,011 B2
(45) Date of Patent: Nov. 27, 2012

(54) APPARATUS FOR FEEDING CONTAINERS TO A DOWNSTREAM PROCESSING UNIT

(75) Inventors: Martin Seger, Neumarkt i. d. Opf. (DE); Johann Huettner, Mallersdorf (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/797,269

(22) Filed: Jun. 9, 2010

(65) Prior Publication Data

US 2010/0326793 A1  Dec. 30, 2010

(30) Foreign Application Priority Data

Jun. 29, 2009 (DE) .......................... 10 2009 026 046

(51) Int. Cl.
*B65G 47/31* (2006.01)
(52) U.S. Cl. ............... 198/459.3; 198/461.2; 198/419.3; 53/448; 53/543
(58) Field of Classification Search ............... 198/461.2, 198/459.3, 418.1
See application file for complete search history.

(56) References Cited

U.S. PATENT DOCUMENTS

| | | | |
|---|---|---|---|
| 3,565,235 A | 2/1971 | Brown et al. | |
| 4,147,011 A * | 4/1979 | Kronseder et al. | ........... 53/136.1 |
| 4,301,912 A | 11/1981 | Cooley et al. | |
| 4,660,708 A * | 4/1987 | Willerding | ............... 198/341.02 |
| 5,647,473 A * | 7/1997 | Miller et al. | ................. 198/461.2 |
| 5,701,726 A * | 12/1997 | Smith | ............................. 53/544 |
| 6,308,817 B1 * | 10/2001 | Corniani et al. | ........... 198/419.3 |

FOREIGN PATENT DOCUMENTS

| | | |
|---|---|---|
| CN | 1239062 | 12/1999 |
| CN | 1426944 | 7/2003 |
| DE | 3149307 | 6/1983 |
| DE | 3637250 | 6/1987 |
| DE | 202006015775 | 10/2007 |
| EP | 1914181 | 4/2008 |
| FR | 1150864 | 1/1958 |
| JP | 57-147812 | 9/1982 |
| JP | 58125520 | 7/1983 |
| JP | S62-59615 | 4/1987 |
| JP | H2-4816 | 1/1990 |
| JP | 07157056 | 6/1995 |

* cited by examiner

*Primary Examiner* — Kavel Singh
(74) *Attorney, Agent, or Firm* — Simpson & Simpson, PLLC

(57) ABSTRACT

An apparatus (1) for feeding containers (4) to a downstream processing unit (2), which receives the containers (4) with a distance (D) between them. At the input end (16) of the infeed worm (6) the containers (4) arrive bunch to bunch and at an exit end (26) of the infeed worm (6) they exhibit the required distance (D) between them. At least two conveyor belts (11, 12), drivable with a constant velocity, are arranged such with respect to the infeed worm (6) that the containers (4) are in contact with a groove (7) of the infeed worm (6). The first conveyor belt (11) at the input end (16) of the infeed worm (6) has a smaller velocity in the direction of transport (T) than the conveyor belt (12) at the exit end (26) of the infeed worm (6).

5 Claims, 2 Drawing Sheets

APPARATUS FOR FEEDING CONTAINERS TO A DOWNSTREAM PROCESSING UNIT

CROSS REFERENCE TO RELATED APPLICATIONS

This patent application claims priority of German Patent Application No. DE 10 2009 026 046.3, filed on Jun. 29, 2009, which application is incorporated herein by reference in its entirety.

FIELD OF THE INVENTION

The present invention relates to an apparatus for feeding containers to a downstream processing unit.

BACKGROUND OF THE INVENTION

The European patent EP 1 914 181 B1 discloses an apparatus for changing the distance between discrete objects or containers, which are transported in succession. The downstream processing unit provided receives the objects with a predefined final distance. In order to reach the predefined final distance an infeed worm is provided for feeding with a variable distance between the initial distance and an intermediary distance between the objects. The infeed worm comprises a groove so that the distance between the individual objects increases downstream. Between the infeed worm and the downstream processing unit a distance changing wheel is provided which achieves the required final distance of the containers, in order to eventually pass on the containers to the downstream processing unit at this final distance.

The German utility model DE 20 2006 015 775 U1 discloses a processing machine for containers like bottles, vessels, plastic containers and the like. The processing machine comprises transfer star wheels which load a processing rotor. The transfer star wheels and the processing rotor each exhibit hold positions for the containers at the outer circumference. The containers are transferred to the rotor of the infeed star wheel at a required distance by an infeed worm. The containers reach the infeed worm via a conveyor belt.

The German patent application DE 31 49 307 discloses an infeed worm for objects to be transported in series, in particular bottles in a labeling machine. The intake section of the infeed worm consists of elastic material and has a pitch corresponding to the bottle diameter so that after lifting an upstream bottle barrier the bottles are received in a cushioned way by the first windings of the infeed worm. In the case of a gapless sequence of bottles in the infeed worm the bottles support each other in the intake section. Therein the pressure is absorbed by the first winding of the acceleration section, which consists of rigid material.

SUMMARY OF THE INVENTION

It is the object of the invention to create an apparatus which enables feeding containers to a downstream processing unit with a predefined distance, in which the safe and damage-free transport of the containers is assured. Furthermore it is to be assured that machine downtime is avoided.

The above object is achieved by an apparatus for feeding containers to a downstream processing unit, which receives the containers with a distance between them. The apparatus has an infeed worm, by which the required distance between the containers is settable via a length of the infeed worm. At an input end of the infeed worm the containers arrive in contact to each other. At an exit end of the infeed worm the containers exhibit the required distance between them, so that the downstream processing unit is able to process the containers according to its rate. A groove is formed along the length of the infeed worm. At least two drivable conveyor belts are arranged in such a way with respect to the infeed worm so that the containers on the least two drivable conveyors are in contact with the groove of the infeed worm. The first conveyor belt at the input end of the infeed worm has a lower velocity in the direction of transport than the conveyor belt at the exit end of the infeed worm.

The term downstream processing unit is to be understood as a labeling machine in the broadest sense. The containers to be labeled, like bottles, cans, and the like, thus can be provided to the labeling machine at a predefined distance by the infeed worm. The predefined distance is necessary so that the containers to be labeled can be transferred in an infeed star wheel for the labeling machine.

As very high belt velocities occur at the exit end of the infeed worm due to the setting of a larger distance, it is necessary for the bottles to sit on the conveyor belts stably. The apparatus according to the invention proposes that at least two drivable conveyor belts are assigned to the infeed worm in such a way with respect to the infeed worm that the containers are in contact with a groove of the infeed worm. The first conveyor belt, which is provided at the input end of the infeed worm, has a smaller transport velocity than the conveyor belt which transports the containers at the exit end of the infeed worm.

In one embodiment, the conveyor belts are driven in such a way that their velocities are adapted to a reference velocity of the infeed worm. The infeed worm, depending on the objects to be processed and the chosen labeling method, rotates with a correspondingly adapted velocity. This velocity is the reference value for the velocities of the conveyor belts assigned to the infeed worm.

According to one embodiment of the invention a first conveyor belt and a second conveyor belt are assigned to the infeed worm. The first and the second conveyor belt therein can be arranged in series one after the other. According to a further embodiment of the invention the first and the second conveyor belt are arranged in parallel. The directions of transport of the first and of the second conveyor belt therein are tilted with respect to an axis of rotation of the infeed worm.

The angle by which the first conveyor belt and the second conveyor belt are tilted with respect to the axis of rotation of the infeed worm is chosen in such a way that at the input end of the infeed worm the containers are in contact with the first conveyor belt only and that at the exit end of the infeed worm the containers are in contact with the second conveyor belt only.

The present invention allows to reduce the velocity in the supply of the containers to the infeed worm. The conveyor belts assigned to the infeed worm have been split. At the input end of the infeed worm the velocity of the conveyor belt would be only slightly larger than the velocity of the stream of bottles, in order that the stream of bottles enters the infeed worm at the input end without gaps. In one embodiment, the infeed worm is arranged at an angle to the conveyor belts. With increasing pitch of the infeed worm the containers are increasingly pushed onto the fast moving second conveyor belt. Thus a linear increase of the pulling force of the conveyor belts on the containers is achieved. The reason for the necessary larger velocity is that the infeed worm must never push the containers by its rotation. When the final pitch of the infeed worm is achieved, the container is completely situated on the faster conveyor belt.

BRIEF DESCRIPTION OF THE DRAWINGS

In the following, embodiments will explain the inventive method and the inventive apparatus and their advantages in more detail with reference to the accompanying drawings.

DETAILED DESCRIPTION OF THE INVENTION

Figure 1:
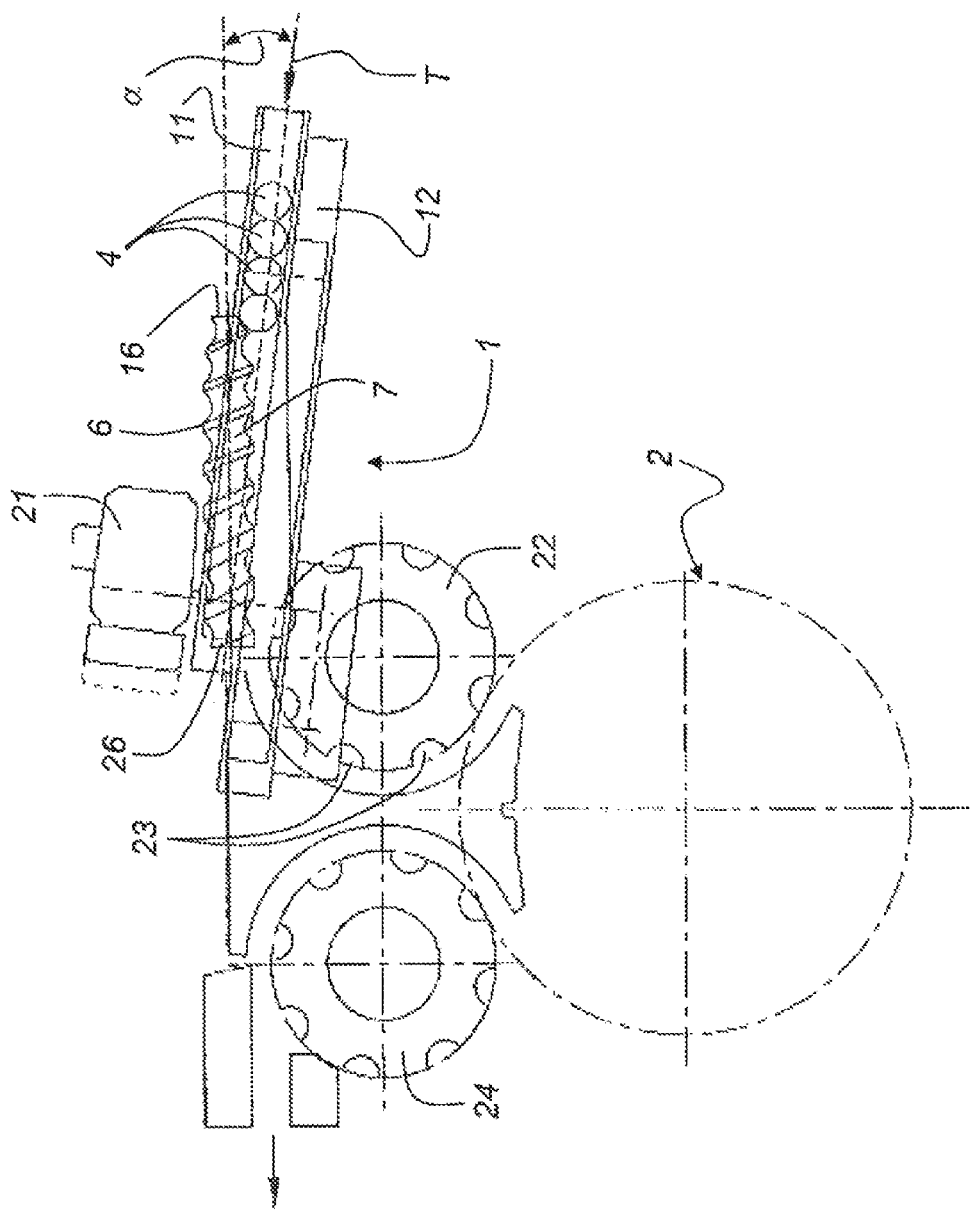
FIG. 1 shows a schematic setup of the apparatus for feeding containers to a downstream processing unit.

Identical reference numerals are used for like elements of the invention or elements of like function. Furthermore, for the sake of clarity only reference numerals are shown in the individual figures which are required for the description of the respective figure. The embodiments shown only are examples of how the apparatus according to the invention can be designed and do not constitute limitations.

FIG. 1 shows a first embodiment of the invention.

Figure 2:
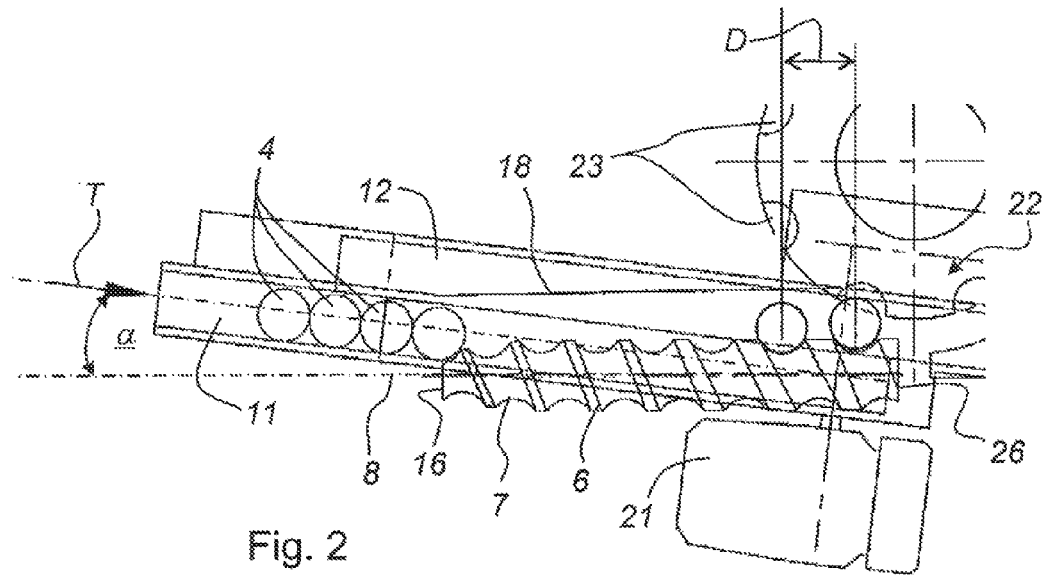
FIG. 2 shows a detailed view of the infeed worm, wherein the two conveyor belts are arranged at an angle with respect to the axis of rotation of the infeed worm.

FIG. 2 shows a detailed view of the first embodiment of the invention. The following should be viewed in light of FIGS. 1 and 2. The containers 4 are passed to an infeed star wheel 22 for the downstream processing unit 2 by the infeed worm 6. From the downstream processing unit 2 the containers 4 reach a discharge star wheel 24. From there the containers 4 reach a packing unit or similar devices. In the embodiment shown in FIG. 1 conveyor belt 11 and conveyor belt 12 are assigned to the infeed worm 6. The conveyor belts 11 and 12 therein are arranged in parallel. For conveyor belt 11 the containers 4 arrive without any distance between them. The conveyor belts 11 and 12 define a direction of transport T, which is tilted by an angle α with respect to an axis of rotation 8 of the infeed worm 6. Via the first conveyor belt 11 the containers 4 reach an input end 16 of the infeed worm 6. The containers 4 eventually are transported to the infeed star wheel 22 of the downstream processing unit 2 through the rotary motion of the infeed worm 6. For this purpose the infeed worm 6 exhibits a groove 7. The pitch of the infeed worm 6 increases from the input end 16 of the infeed worm 6 to the exit end 26 of the infeed worm 6.

In the embodiment shown in FIG. 1 the containers 4 are more and more subject to the influence of the second conveyor belt 12, the further the containers 4 have moved in the direction towards the exit end 26 of the infeed worm 6. In order to assure that the containers 4 are always in contact with the infeed worm 6 during the motion from the input end 16 of the infeed worm 6 to the exit end 26 of the infeed worm 6, a corresponding guiding 18 parallel to the infeed worm 6 is provided. The second conveyor belt 12 has a higher velocity than the first conveyor belt 11. Thus it is assured that the containers 4 are not pushed through the rotation of the infeed worm 6.

The first and the second conveyor belt 11, 12 therein are arranged at an angle α with respect to the axis of rotation 8 of the infeed worm 6. The infeed worm 6 is driven by a motor 21. As the first conveyor belt 11 and the second conveyor belt 12 are arranged in parallel, the direction of transport T also is tilted by the angle α with respect to the axis of rotation 8 of the infeed worm 6. The containers 4 reach the beginning 16 of the infeed worm 6 via the first conveyor belt 11 bunch to bunch.

In order to assure that the containers 4 are supplied bunch to bunch, the velocity of transport of the first conveyor belt 11 is chosen in such a way that the velocity of transport of the first conveyor belt 11 is slightly larger than the velocity of transport of the infeed worm 6. Thus the containers 4 are passed to the infeed worm 6 under a slight pressure. A guiding 18 is arranged parallel to the infeed worm 6, in order to assure that the containers 4 are always in contact with the groove 7 or with the infeed worm 6 during the transport of the containers 4 from the beginning 16 of the infeed worm 6 to the end 26 of the infeed worm 6. At the end 26 of the infeed worm 6 the containers 4 have reached a required distance D for them to be transferred to the hold positions 23 of an infeed star wheel 22.

Figure 3:
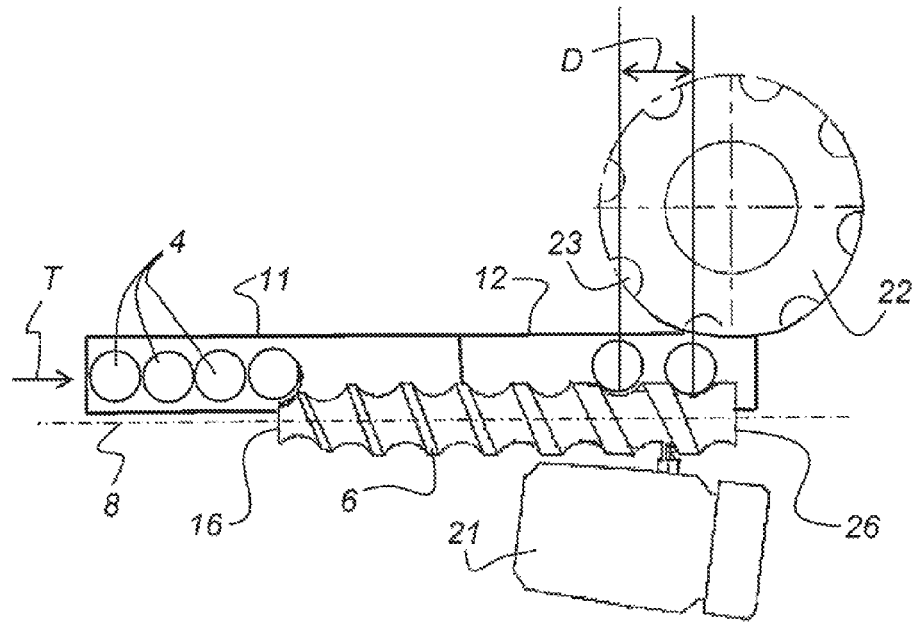
FIG. 3 shows a further embodiment of the invention, wherein two conveyor belts are arranged in series one after the other with respect to the infeed worm.

FIG. 3 shows a further embodiment of the invention. Here a first conveyor belt 11 and a second conveyor belt 12 are arranged in series one after the other. The direction of transport T of the first conveyor belt 11 and of the second conveyor belt 12 therein are arranged parallel to the axis of rotation 8 of the infeed worm 6. In analogy with the embodiment described in FIG. 2 the velocity of transport of the first conveyor belt 11 is chosen such that the containers 4 are passed to the infeed worm 6 by means of a slight pressure. The velocities of transport of the first conveyor belt 11 and of the second conveyor belt 12 therein are chosen such that the rotary motion of the infeed worm 6 does not lead to a pushing of the containers 4 on the second conveyor belt 12 at the end 16 of the infeed worm 6. At the end 26 of the infeed worm 6 the containers 4 have reached the required distance D for them to be transferred into the hold positions 23 of an infeed worm 22 without problems.

Though the description of FIG. 3 is restricted to two conveyor belts 11 and 12, this is not to be taken as a limitation of the invention. It is obvious for a person skilled in the art that more than two conveyor belts can be arranged in series and parallel to the infeed worm 6. The transport velocity of the individual belts therein increases from the beginning 16 of the infeed worm 6 to the end 26 of the infeed worm 6. The transport velocity of each belt therein is adapted to the reference velocity of the infeed worm 6. Through the increase of the transport velocities of the individual conveyor belts with respect to each other an adaptation of the conveyor belts to the increasing transport velocity of the containers 4 by the infeed worm 6 is achieved.

The invention has been described with reference to preferred embodiments. It is obvious to a person skilled in the art that alterations and modifications of the invention can be made without leaving the scope of the subsequent claims.

What we claim is:

1. An apparatus for feeding containers to a downstream processing unit, which receives the containers with a distance between them, comprising:

an infeed worm, by which a required distance between the containers is settable via a length of the infeed worm, wherein at an input end of the infeed worm the containers arrive in contact with each other and at an exit end of the infeed worm adjacent containers are spaced apart by the required distance;

a groove formed along the length of the infeed worm; and first and second drivable conveyor belts which are arranged in such a way with respect to the infeed worm that the containers are in simultaneous contact with the groove of the infeed worm and with the first and second driveable conveyor belts, wherein:

the first conveyor belt at the input end of the infeed worm has a lower velocity in the direction of transport than the second conveyor belt at the exit end of the infeed worm;

the first and the second conveyor belt are arranged in parallel; and the directions of transport of the first and of the second conveyor belt are tilted by an angle with respect to an axis of rotation of the infeed worm and the containers reach the input end of the infeed worm via the first conveyor belt, wherein:

- a pitch of the infeed worm increases from the input end of the infeed worm to the exit end of the infeed worm;
- the infeed worm is arranged such that the increase in the pitch of the infeed worm causes the containers to be increasingly pushed onto the fast moving second conveyor belt; and,
- the containers exit the infeed worm at the exit end on the second conveyor belt.

2. The apparatus of claim 1, wherein the conveyor belts are drivable in such a way that respective velocities for the conveyor belts are adapted to a reference velocity of the infeed worm.

3. The apparatus of claim 2, wherein the angle is chosen in such a way that at the input end of the infeed worm the container is in contact with the first conveyor belt only and that at the exit end of the infeed worm the containers are in contact with the second conveyor belt only.

4. The apparatus of claim 2, wherein a guiding is provided parallel to the infeed worm in order that the contact of the containers with the infeed worm is assured.

5. The apparatus of claim 1, wherein a pitch of the infeed worm increases from the input end of the infeed worm to the exit end of the infeed worm.

* * * * *